United States Patent
Shiratori (10) Patent No.: US 10,222,082 B2
(45) Date of Patent: Mar. 5, 2019

(54) AIR CONDITIONER, AIR CONDITIONER SYSTEM, AND REWRITE CONTROL PROGRAM WITH REWRITE CONTROL FOR CONTROL DATA

(71) Applicant: Mitsubishi Electric Corporation, Tokyo (JP)

(72) Inventor: Mitsugu Shiratori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 99 days.

(21) Appl. No.: 15/118,265

(22) PCT Filed: Dec. 12, 2014

(86) PCT No.: PCT/JP2014/082979
§ 371 (c)(1),
(2) Date: Aug. 11, 2016

(87) PCT Pub. No.: WO2015/136804
PCT Pub. Date: Sep. 17, 2015

(65) Prior Publication Data
US 2017/0138625 A1    May 18, 2017

(30) Foreign Application Priority Data
Mar. 11, 2014    (JP) .................. 2014-047422

(51) Int. Cl.
*G05B 11/01*    (2006.01)
*F24F 11/30*    (2018.01)
(Continued)

(52) U.S. Cl.
CPC .............. *F24F 11/30* (2018.01); *F24F 11/62* (2018.01); *F24F 11/89* (2018.01); *G05B 13/042* (2013.01); *F24F 11/56* (2018.01); *F24F 11/64* (2018.01)

(58) Field of Classification Search
CPC .................................................. G05B 13/042
See application file for complete search history.

(56) References Cited

U.S. PATENT DOCUMENTS 5,442,926 A * 8/1995 Kawai ............... G05D 23/1917
62/211
6,453,689 B2    9/2002 Wada
(Continued)

FOREIGN PATENT DOCUMENTS

CN    1311418 A    9/2001
JP    06-259260 A    9/1994
(Continued)

OTHER PUBLICATIONS

Office Action dated Feb. 21, 2017 in the corresponding Japanese patent application No. 2014-047422 (and English translation).
(Continued)

*Primary Examiner* — Adam Lee
(74) *Attorney, Agent, or Firm* — Posz Law Group, PLC (57) ABSTRACT

An air conditioner has a control-data storage unit to store therein control data, a buffer unit to store therein update data of the control data, a rewriting unit, a data reception unit, and a reception processing unit. The rewriting unit executes a rewriting process of rewriting the control data stored in the control-data storage unit with the update data stored in the buffer unit. The data reception unit receives, through a wireless communication, the update data that is transmitted multiple times from a transmitter. The reception processing unit determines whether the rewriting process is in progress at a time when the update data is received, discards the received update data if the rewriting process is in progress, and stores the received update data in the buffer unit if the rewriting process is not in progress.

14 Claims, 9 Drawing Sheets

(51) Int. Cl.
  F24F 11/89 (2018.01)
  F24F 11/62 (2018.01)
  G05B 13/04 (2006.01)
  F24F 11/56 (2018.01)
  F24F 11/64 (2018.01)

(56) References Cited

U.S. PATENT DOCUMENTS

| | | | | |
|---|---|---|---|---|
| 8,995,568 | B1* | 3/2015 | Wu | H04L 25/49 |
| | | | | 375/260 |
| 2001/0022089 | A1 | 9/2001 | Wada | |
| 2003/0185186 | A1* | 10/2003 | Tsutsumi | H04L 47/10 |
| | | | | 370/338 |
| 2004/0148379 | A1* | 7/2004 | Ogura | H04L 29/06 |
| | | | | 709/223 |
| 2004/0258414 | A1* | 12/2004 | Lee | H04B 10/1123 |
| | | | | 398/115 |
| 2005/0033828 | A1* | 2/2005 | Watanabe | G06F 11/2074 |
| | | | | 709/219 |
| 2005/0039471 | A1 | 2/2005 | Smith et al. | |
| 2007/0061487 | A1* | 3/2007 | Moore | G06F 17/30575 |
| | | | | 709/246 |
| 2007/0288505 | A1* | 12/2007 | Kato | G11B 27/034 |
| 2008/0141235 | A1* | 6/2008 | Woodbury | G06F 8/60 |
| | | | | 717/168 |
| 2008/0217417 | A1 | 9/2008 | Hatano et al. | |
| 2009/0037676 | A1* | 2/2009 | Coronado | G06F 11/2069 |
| | | | | 711/162 |
| 2009/0234511 | A1* | 9/2009 | Ouchi | H02J 3/14 |
| | | | | 700/291 |
| 2010/0205348 | A1* | 8/2010 | Moshayedi | G11C 5/14 |
| | | | | 711/102 |
| 2010/0228919 | A1* | 9/2010 | Stabrawa | G06F 11/1456 |
| | | | | 711/120 |
| 2011/0099145 | A1* | 4/2011 | Hahn | G06F 17/30218 |
| | | | | 707/613 |
| 2011/0132014 | A1* | 6/2011 | Eisenhour | B60H 1/3216 |
| | | | | 62/228.1 |
| 2011/0320856 | A1* | 12/2011 | Deivasigamani | H04L 1/0053 |
| | | | | 714/2 |
| 2011/0321172 | A1* | 12/2011 | Maeda | G06F 21/10 |
| | | | | 726/27 |
| 2012/0150802 | A1* | 6/2012 | Popov | G06F 11/1487 |
| | | | | 707/635 |
| 2012/0232714 | A1* | 9/2012 | Ricket | G06F 1/26 |
| | | | | 700/297 |
| 2012/0323402 | A1* | 12/2012 | Murakami | G06F 8/65 |
| | | | | 701/1 |
| 2013/0191588 | A1* | 7/2013 | Starr | G06F 3/0611 |
| | | | | 711/112 |
| 2013/0197712 | A1* | 8/2013 | Matsuura | B60R 25/24 |
| | | | | 701/1 |
| 2013/0212571 | A1* | 8/2013 | Matsuura | G06F 8/65 |
| | | | | 717/170 |
| 2013/0297854 | A1* | 11/2013 | Gupta | G06F 11/1441 |
| | | | | 711/103 |
| 2014/0009174 | A1* | 1/2014 | Youssi | G01N 27/223 |
| | | | | 324/665 |
| 2014/0019521 | A1* | 1/2014 | Ohsumi | H04L 67/42 |
| | | | | 709/203 |
| 2014/0039646 | A1* | 2/2014 | Komiya | G06F 9/52 |
| | | | | 700/12 |
| 2014/0331230 | A1* | 11/2014 | Reinhardt | G06F 9/4843 |
| | | | | 718/102 |
| 2014/0370469 | A1* | 12/2014 | Krystek | A47L 15/0063 |
| | | | | 434/236 |

FOREIGN PATENT DOCUMENTS

| | | |
|---|---|---|
| JP | 11-173626 A | 7/1999 |
| JP | 11-201533 A | 7/1999 |
| JP | 2001-241738 A | 9/2001 |
| JP | 2004-163102 A | 6/2004 |
| JP | 2004-192329 A | 7/2004 |
| JP | 2006-214599 A | 8/2006 |
| JP | 2007-503056 A | 2/2007 |
| JP | 2007-078221 A | 3/2007 |
| JP | 2008-281231 A | 11/2008 |
| JP | 2009-133549 A | 6/2009 |

OTHER PUBLICATIONS

International Search Report of the International Searching Authority dated Mar. 3, 2015 for the corresponding International application No. PCT/JP2014/082979 (and English translation).

Extended European Search Report dated Jan. 4, 2018 issued in corresponding EP patent application No. 14885157.9.

Office action dated Jul. 27, 2018 issued in corresponding CN patent application No. 201480077008.6 (and English translation thereof).

* cited by examiner

AIR CONDITIONER, AIR CONDITIONER SYSTEM, AND REWRITE CONTROL PROGRAM WITH REWRITE CONTROL FOR CONTROL DATA

CROSS REFERENCE TO RELATED APPLICATIONS

This application is a U.S. national stage application of PCT/JP2014/082979 filed on Dec. 12, 2014, and is based on Japanese Patent Application No. 2014-047422filed on Mar. 11, 2014, the disclosures of which are incorporated herein by reference.

FIELD

The present invention relates to a technique of rewriting control data of an air conditioner.

BACKGROUND

An air conditioner performs air-conditioning control based on control data (including a control program). The followings are known as techniques related to rewriting the control data.

Patent Literature 1 discloses a technique of rewriting a control program through a wireless communication. More specifically, the control program is stored in a rewritable nonvolatile memory and is rewritten by a wireless signal transmitted from a wireless remote controller.

Patent Literature 2 discloses a technique that a maintenance management center centrally controls a large number of air conditioners. When updating the control program, the maintenance management center rewrites, through the Internet or a wireless communication, the control program of an air conditioner that is not operating.

Patent Literature 3 discloses a technique of preventing erroneous writing of the control data. More specifically, an ID code is assigned for each model of an air conditioner, and an ID code of a rewriting target is given to a control-data rewrite instruction. If the ID codes match each other, the rewriting of the control data is performed.

CITATION LIST

Patent Literatures

Patent Literature 1: Japanese Patent Application Laid-open No. H11-201533
Patent Literature 2: Japanese Patent Application Laid-open No. 2004-163102
Patent Literature 3: Japanese Patent Application Laid-open No. 2001-241738

SUMMARY

Technical Problem

Rewriting control data of an air conditioner through a wireless communication is excellent in terms of work efficiency. However, in the case of the wireless communication, there is a possibility that communication interruption is caused. If the communication interruption is caused, transfer of the control data is not completed successfully and thus a rewriting error is caused.

An object of the present invention is to provide a technique that can suppress a rewriting error when rewriting control data of an air conditioner through a wireless communication.

Solution to Problem

In an aspect of the present invention, an air conditioner is provided. The air conditioner has a control-data storage unit, a buffer unit, a rewriting unit, a data reception unit, and a reception processing unit. The control-data storage unit stores therein control data for air-conditioning control. The buffer unit stores therein update data of the control data. The rewriting unit executes a rewriting process of rewriting the control data stored in the control-data storage unit with the update data stored in the buffer unit. The data reception unit receives, through a wireless communication, the update data that is transmitted multiple times from a transmitter. The reception processing unit determines whether or not the rewriting process is in progress at a time when the update data is received, discards the received update data if the rewriting process is in progress, and stores the received update data in the buffer unit if the rewriting process is not in progress.

In another aspect of the present invention, an air conditioner system is provided. The air conditioner system has: an air conditioner to perform air-conditioning control based on control data; and a transmitter to transmit update data of the control data multiple times through a wireless communication. The air conditioner has: a control-data storage unit to store therein the control data; a buffer unit to store therein the update data; a rewriting unit; a data reception unit; and a reception processing unit. The rewriting unit executes a rewriting process of rewriting the control data stored in the control-data storage unit with the update data stored in the buffer unit. The data reception unit receives, through a wireless communication, the update data transmitted from the transmitter. The reception processing unit determines whether or not the rewriting process is in progress at a time when the update data is received, discards the received update data if the rewriting process is in progress, and stores the received update data in the buffer unit if the rewriting process is not in progress.

In still another aspect of the present invention, a rewrite control program that is executed by a controller of an air conditioner is provided. The controller has: a control-data storage unit to store therein control data for air-conditioning control; a buffer unit to store therein update data of the control data; and a data reception unit to receive, through a wireless communication, the update data that is transmitted multiple times from a transmitter. The rewrite control program causes the controller to execute steps of: (A) executing a rewriting process of rewriting the control data stored in the control-data storage unit with the update data stored in the buffer unit; (B) determining whether or not the rewriting process is in progress at a time when the update data is received; (C) discarding the received update data if the rewriting process is in progress, and storing the received update data in the buffer unit if the rewriting process is not in progress.

Advantageous Effects of Invention

According to the present invention, it is possible to suppress a rewriting error when rewriting control data of an air conditioner through a wireless communication.

DESCRIPTION OF EMBODIMENTS

Exemplary embodiments of the present invention will be described with reference to the accompanying drawings.

First Embodiment

Figure 1:
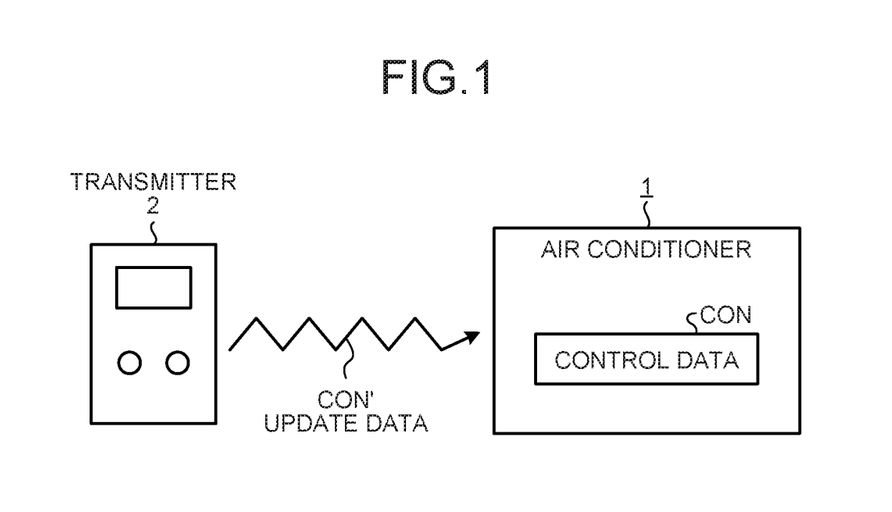
FIG. 1 is a schematic diagram illustrating an air conditioner system according to a first embodiment of the present invention.

FIG. 1 is a schematic diagram illustrating an air conditioner system according to a first embodiment of the present invention. The air conditioner system includes an air conditioner 1 and a transmitter 2. The air conditioner 1 and the transmitter 2 are so connected as to be able to perform a wireless communication with each other. For example, the air conditioner 1 and the transmitter 2 are connected with each other through a high-speed wireless communication network such as a wireless LAN.

The air conditioner 1 performs air-conditioning control based on control data CON. Typically, the control data CON is a control program executed by a processor of the air conditioner 1. However, the control data CON is not limited only to the control program, and can also include other kinds of data necessary for the air-conditioning control. That is, in the present embodiment, the control data CON is data used for the air-conditioning control by the air conditioner 1, and means a broad concept including the control program.

The control data CON is rewritten as necessary. New control data CON is hereinafter referred to as "update data CON'". That is, the update data CON' is the control data CON for updating (rewriting).

It is the transmitter 2 that transmits the update data CON'. That is, the transmitter 2 transmits the update data CON' to the air conditioner 1 through a wireless communication. The air conditioner 1 receives the update data CON' from the transmitter 2 through a wireless communication. Then, the air conditioner 1 rewrites the control data CON with the received update data CON'.

Figure 2:
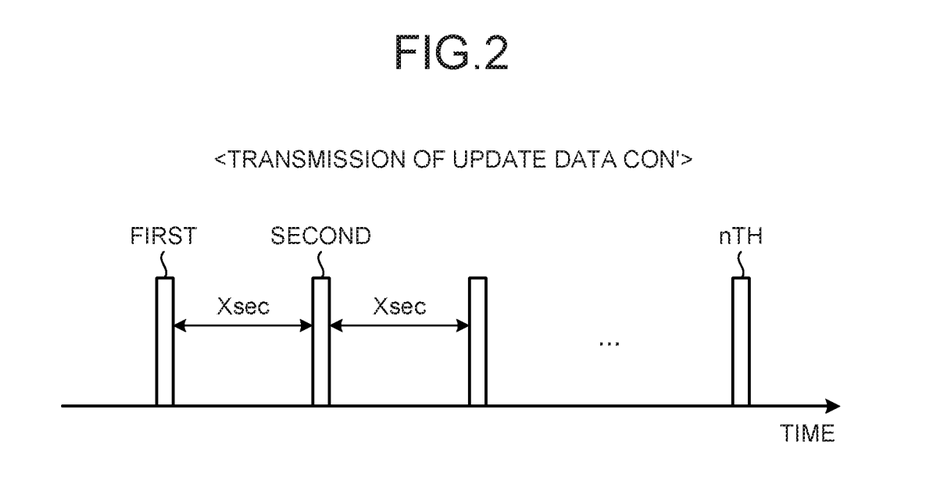
FIG. 2 is a conceptual diagram illustrating transmission of update data from a transmitter in the first embodiment of the present invention.

According to the present embodiment, the transmitter 2 transmits the update data CON' multiple times. For example, as shown in FIG. 2, the transmitter 2 performs the transmission of the update data CON' for n times at constant time (X seconds) interval. Here, n is an integer equal to or larger than 2. The number of repetition times n and the transmission interval X can be variably set on the side of the transmitter 2.

Figure 3:
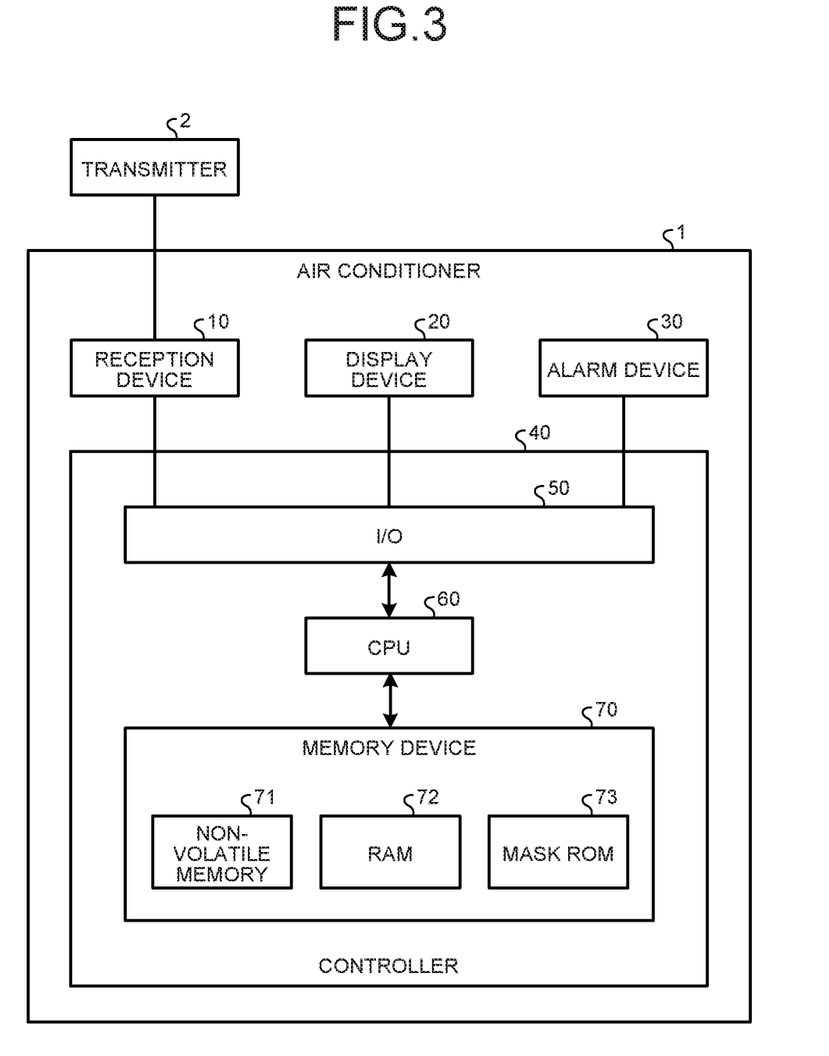
FIG. 3 is a block diagram illustrating a configuration example of the air conditioner according to the first embodiment of the present invention.

FIG. 3 is a block diagram illustrating a configuration example of the air conditioner 1 according to the present embodiment. The air conditioner 1 is provided with a reception device 10, a display device 20, an alarm device 30, and a controller 40.

The reception device 10 receives a wireless signal transmitted from the transmitter 2. The display device 20 is for notifying a user of an operation state of the air conditioner 1 and the like, and exemplified by a display and an LED. The alarm device 30 is exemplified by a buzzer.

The controller 40 is a control device for controlling operations of whole of the air conditioner 1. For example, the controller 40 is a microcomputer. The controller 40 performs the air-conditioning control based on the control data CON. Further, the controller 40 executes a rewrite control program to perform rewrite control of the control data CON which will be described later.

More specifically, the controller 40 has an I/O interface 50, a CPU 60, and a memory device 70. The I/O interface 50 is connected to the reception device 10, the display device 20, and the alarm device 30. The CPU 60 can perform data communication with the reception device 10, the display device 20, and the alarm device 30 through the I/O interface 50. Further, the CPU 60 can access the memory device 70.

The memory device 70 includes a nonvolatile memory 71, a RAM 72, and a mask ROM 73. The nonvolatile memory 71 is a data-rewritable nonvolatile memory, and exemplified by a flash memory and an EEPROM. The nonvolatile memory 71 is used for storing the control data CON. The RAM 72 is used for storing temporary data. The mask ROM 73 is used for storing various parameters and programs.

The CPU 60 performs the air-conditioning control based on the control data CON stored in the nonvolatile memory 71. Further, the CPU 60 executes a rewrite control program to perform rewrite control of the control data CON which will be described later. The rewrite control program is stored in the nonvolatile memory 71 or the mask ROM 73. Alternatively, the rewrite control program may be stored in a computer-readable recording medium.

Figure 4:
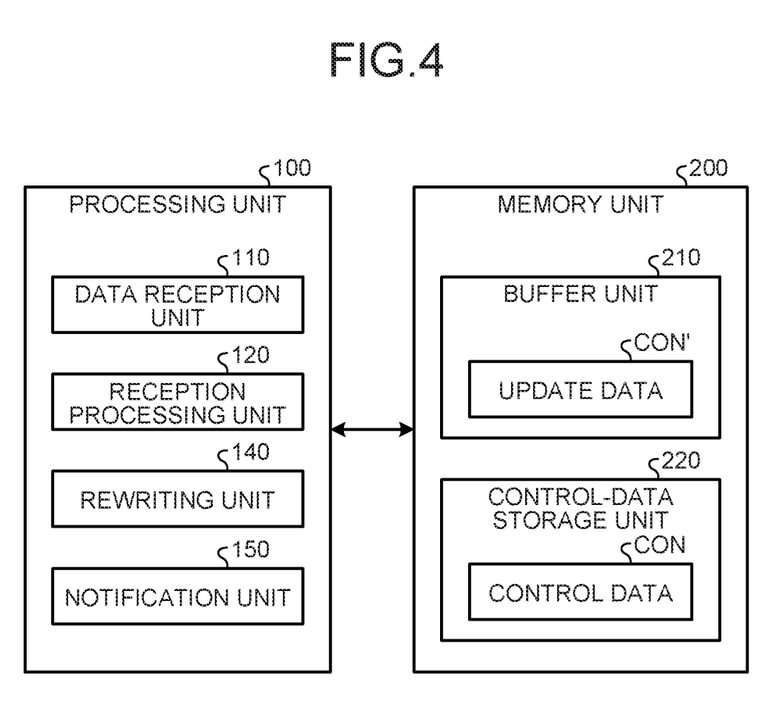
FIG. 4 is a block diagram illustrating a functional configuration of the air conditioner according to the first embodiment of the present invention.

FIG. 4 is a block diagram illustrating a functional configuration of the air conditioner 1 according to the present embodiment. The air conditioner 1 has a processing unit 100 and a memory unit 200.

The memory unit 200 is a functional block for storing various kinds of data, and includes a buffer unit 210 and a control-data storage unit 220.

The update data CON' received from the transmitter 2 is stored in the buffer unit 210. The buffer unit 210 is realized by the RAM 72.

The control data CON is stored in the control-data storage unit 220. The control-data storage unit 220 is realized by the nonvolatile memory 71.

The processing unit 100 is a functional block for performing various kinds of data processing, and includes a data reception unit 110, a reception processing unit 120, a rewriting unit 140, and a notification unit 150.

The data reception unit 110 receives, through a wireless communication, the update data CON' transmitted from the transmitter 2. The data reception unit 110 is realized by the reception device 10.

The rewriting unit 140 executes a "rewriting process". More specifically, the rewriting unit 140 rewrites (updates) the control data CON stored in the control-data storage unit 220 with the update data CON' stored in the buffer unit 210. The rewriting unit 140 is realized by the CPU 60 executing the rewrite control program.

The reception processing unit 120 determines whether or not the rewriting process is in progress in the rewriting unit 140 at a time when the data reception unit 110 receives the update data CON'. If the rewriting process is in progress, the reception processing unit 120 discards the received update data CON'. On the other hand, if the rewriting process is not in progress, the reception processing unit 120 stores the received update data CON' in the buffer unit 210. The reception processing unit 120 is realized by the CPU 60 executing the rewrite control program.

The notification unit 150 notifies a user of completion of the rewriting process performed by the rewriting unit 140. The notification unit 150 is realized by the display device 20 and the alarm device 30.

Figure 5:
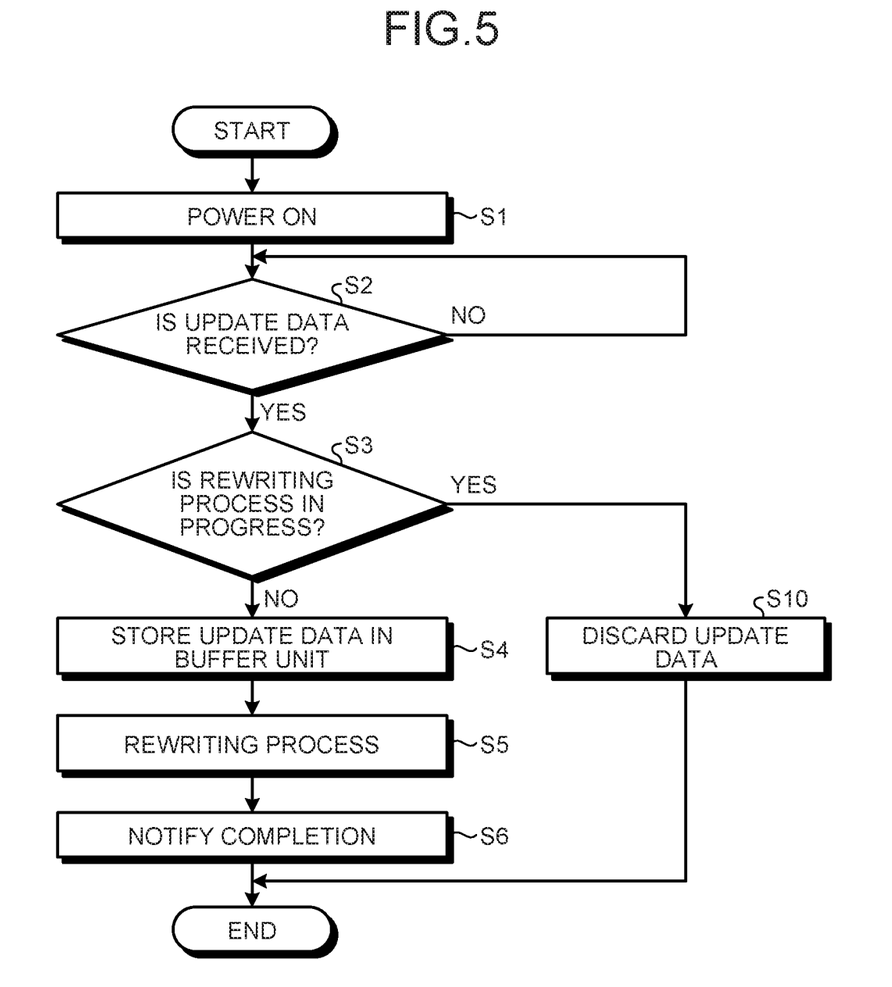
FIG. 5 is a flowchart illustrating rewrite control of control data in the first embodiment of the present invention.

FIG. 5 is a flowchart illustrating the rewrite control of the control data CON in the present embodiment.

Step S1:

The air conditioner 1 is powered ON. The controller 40 performs a power-on reset.

Step S2:

The data reception unit 110 waits for the update data CON' to be transmitted from the transmitter 2 through a wireless communication (Step S2; No). When receiving the update data CON' (Step S2; Yes), the data reception unit 110 sends the received update data CON' to the reception processing unit 120. After that, the process proceeds to Step S3.

Step S3:

When receiving the update data CON', the reception processing unit 120 determines whether or not the rewriting process is in progress in the rewriting unit 140. If the rewriting process is in progress (Step S3; Yes), the process proceeds to Step S10, and the reception processing unit 120 discards the received update data CON'. On the other hand, if the rewriting process is not in progress (Step S3; No), the process proceeds to Step S4.

Step S4:

The reception processing unit 120 stores the received update data CON' in the buffer unit 210. By utilizing the buffer unit 210, it is possible to handle high-speed reception of the update data CON' through the wireless communication. When storing the update data CON' in the buffer unit 210 is completed, the process proceeds to Step S5.

Step S5:

The rewriting unit 140 performs the rewriting process. That is, the rewriting unit 140 rewrites (updates) the control data CON stored in the control-data storage unit 220 with the update data CON' stored in the buffer unit 210. When the rewriting process is completed, the process proceeds to Step S6.

Step S6:

The notification unit 150 notifies a user of completion of the rewriting process. For example, the notification unit 150 displays the completion on a display, or sounds a buzzer.

According to the present embodiment, as described above, the update data CON' is transmitted from the transmitter 2 to the air conditioner 1 through a wireless communication. The air conditioner 1 rewrites the control data CON based on the update data CON' received from the transmitter 2.

Such a usage of the wireless communication is excellent in terms of work efficiency. Moreover, using a high-speed wireless communication network such as a wireless LAN enables high-speed distribution of the update data CON' to a large number of air conditioners 1, which is preferable. In addition, since the air conditioner 1 is provided with the buffer unit 210 for temporarily storing the update data CON', it is possible to handle high-speed reception of the update data CON'.

Furthermore, according to the present embodiment, the air conditioner 1 has a function of determining whether or not the rewriting process is in progress at a time when the update data CON' is received. If the rewriting process is in progress, the received update data CON' is discarded. Since the air conditioner 1 has such the function, the transmitter 2 can transmit the update data CON' multiple times (see FIG. 2). Even when the air conditioner 1 receives the update data CON' sequentially, the rewriting process is not interfered by the subsequent update data CON', when the rewriting process is being executed successfully.

Transmitting the update data CON' multiple times by the transmitter 2 is effective when interruption of the wireless communication is caused. Even if interruption of the wireless communication occurs in a certain period, probability that the air conditioner 1 successfully receives the update data CON' becomes remarkably high, because the update data CON' is transmitted multiple times. Therefore, a rewriting error when rewriting the control data CON through the wireless communication is suppressed. In other words, reliability of the air conditioner 1 is improved.

Second Embodiment

According to a second embodiment of the present invention, the air conditioner 1 decides, based on predetermined criteria, whether to permit or prohibit the "rewriting process" performed by the rewriting unit 140. The predetermined criteria includes, for example, whether or not the received update data CON' is for a model of the air conditioner 1 itself. That is, the air conditioner 1 permits rewriting of the control data CON only when the received update data CON' is for the model of the air conditioner 1 itself.

Figure 6:
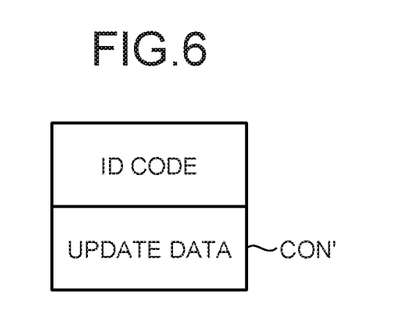
FIG. 6 is a conceptual diagram illustrating update data in a second embodiment of the present invention.

More specifically, an ID code (identification information) is allocated in advance to the air conditioner 1. For example, the ID code is different depending on models of the air conditioner 1. Moreover, as shown in FIG. 6, an ID code of a target air conditioner 1 being a target of the rewriting process is given to the update data CON' transmitted from the transmitter 2.

Figure 7:
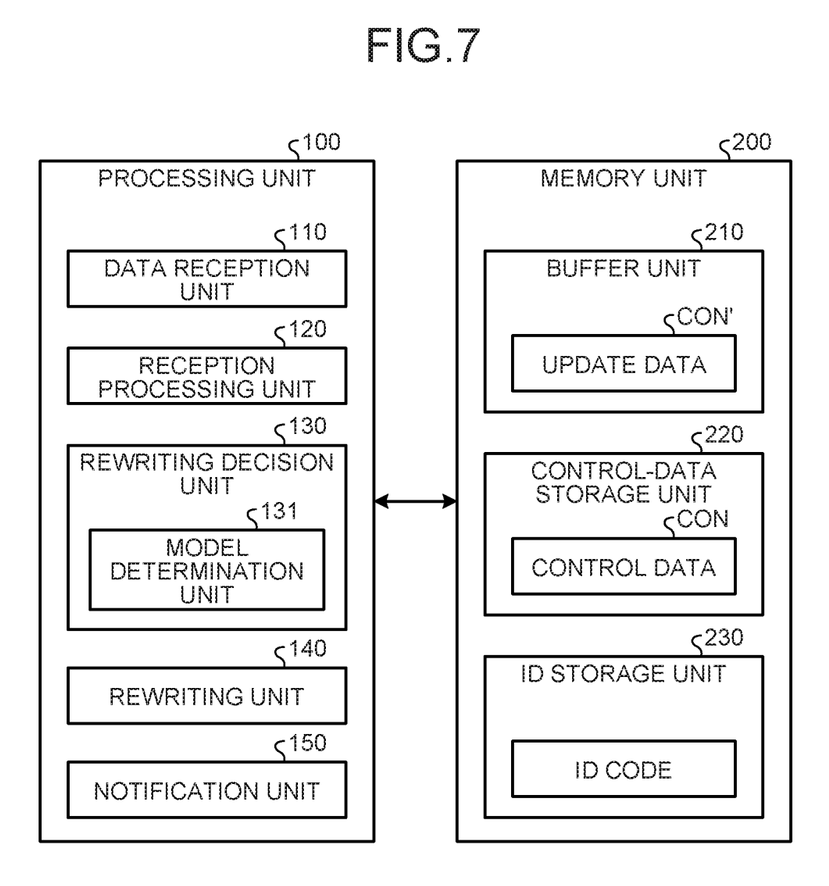
FIG. 7 is a block diagram illustrating a functional configuration of an air conditioner according to the second embodiment of the present invention.

FIG. 7 is a block diagram illustrating a functional configuration of the air conditioner 1 according to the present embodiment. Overlapping descriptions with the foregoing first embodiment will be omitted as appropriate. As shown in FIG. 7, as compared to the first embodiment described above, the processing unit 100 further includes a rewriting decision unit 130, and the memory unit 200 further includes an ID storage unit 230.

An ID code of the air conditioner 1 is stored in the ID storage unit 230. The ID storage unit 230 is realized by the mask ROM 73 or the nonvolatile memory 71.

The rewriting decision unit 130 decides whether to permit or prohibit the "rewriting process" performed by the rewriting unit 140. When permitted by the rewriting decision unit 130, the rewriting unit 140 executes the rewriting process. When prohibited by the rewriting decision unit 130, the rewriting unit 140 does not execute the rewriting process.

The rewriting decision unit 130 is realized by the CPU 60 executing the rewrite control program.

According to the present embodiment, the rewriting decision unit 130 includes a model determination unit 131. The model determination unit 131 determines whether or not the received update data CON' is for a model of the air conditioner 1 itself. More specifically, the model determination unit 131 determines whether or not the ID code given to the received update data CON' matches the ID code stored in the ID storage unit 230. If the ID codes match each other, the model determination unit 131 determines that the received update data CON' is for the model of the air conditioner 1 itself, and the rewriting decision unit 130 permits the rewriting process. On the other hand, if the ID codes do not match each other, the model determination unit 131 determines that the received update data CON' is not for the model of the air conditioner 1 itself, and the rewriting decision unit 130 prohibits the rewriting process.

Figure 8:
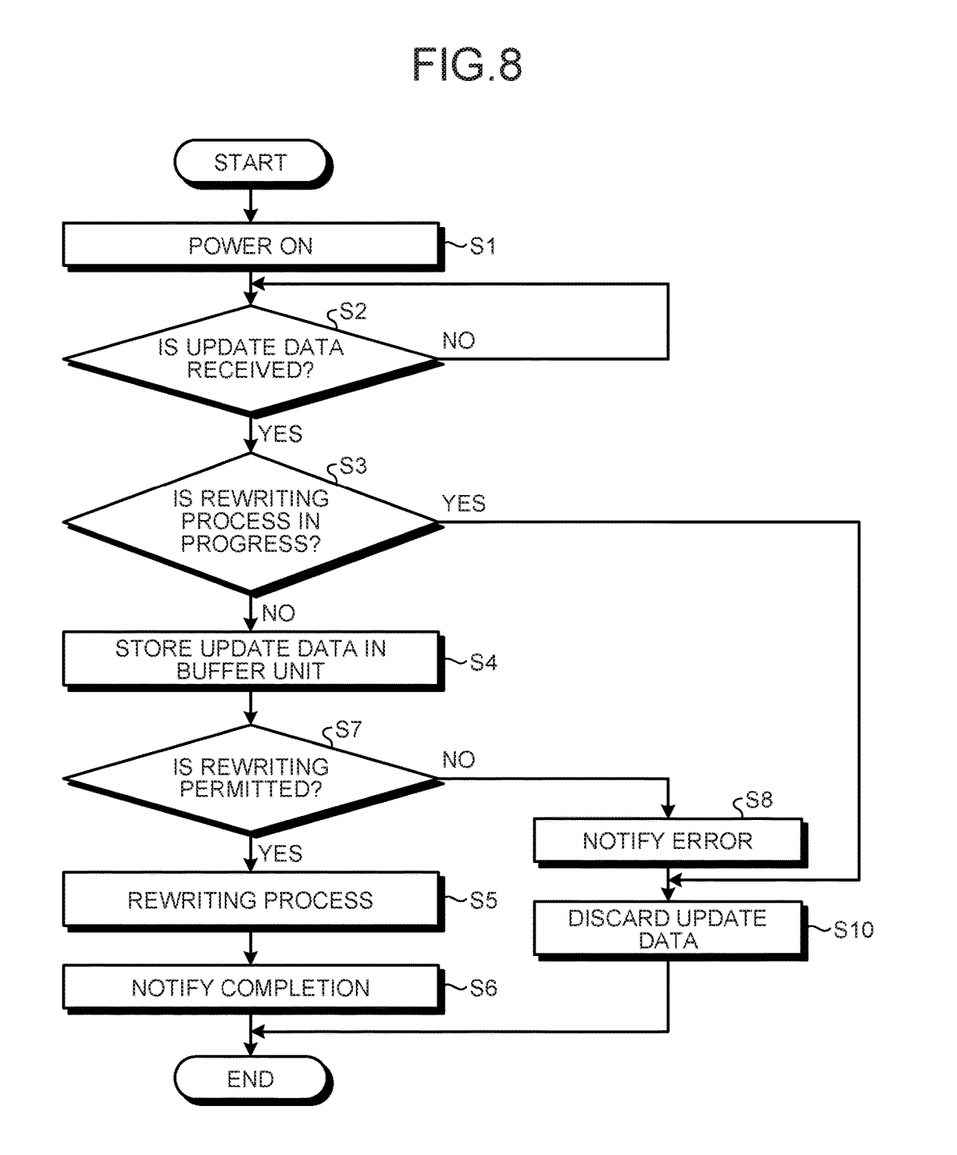
FIG. 8 is a flowchart illustrating rewrite control of control data in the second embodiment of the present invention.

FIG. 8 is a flowchart illustrating the rewrite control of the control data CON in the present embodiment. Overlapping descriptions with the foregoing first embodiment will be omitted as appropriate. As shown in FIG. 8, Steps S7 and S8 are added, as compared to the first embodiment described above.

Step S7:

The rewriting decision unit 130 decides whether to permit or prohibit the "rewriting process" performed by the rewriting unit 140. More specifically, the model determination unit 131 determines whether or not the ID code given to the received update data CON' matches the ID code stored in the ID storage unit 230.

If the ID codes match each other, the model determination unit 131 determines that the received update data CON' is for the model of the air conditioner 1 itself. In this case, the rewriting decision unit 130 permits the rewriting process (Step S7; Yes). After that, the process proceeds to Step S5, and the rewriting unit 140 executes the rewriting process.

On the other hand, if the ID codes do not match each other, the model determination unit 131 determines that the received update data CON' is not for the model of the air conditioner 1 itself. In this case, the rewriting decision unit 130 prohibits the rewriting process (Step S7; Yes). After that, the process proceeds to Step S8.

Step S8:

The notification unit 150 notifies a user of the fact that the rewriting process is not executed. For example, the notification unit 150 displays the fact that the rewriting process is not executed on a display, or sounds a buzzer. After that, the process proceeds to Step S10, and the rewriting decision unit 130 discards the received update data CON'. In this case, the rewriting process by the rewriting unit 140 is not executed.

In the flow shown in FIG. 8, Steps S7 and S8 are performed after Step S4. However, Steps S7 and S8 can be performed at any timing between Step S2 and Step S5.

According to the present embodiment, it is possible to prevent erroneous rewriting of the control data CON. Furthermore, in a case where there are plural models within the same area, it is possible to perform rewriting of the control data CON selectively only on a desired model.

Third Embodiment

Also in a third embodiment of the present invention, the air conditioner 1 decides, based on predetermined criteria, whether to permit or prohibit the "rewriting process" performed by the rewriting unit 140. In the present embodiment, the predetermined criteria includes whether or not an elapsed time since power-ON (main power supply ON) of the air conditioner 1 exceeds a predetermined time. When the elapsed time exceeds the predetermined time, the air conditioner 1 "prohibits" rewriting of the control data CON.

Figure 9:
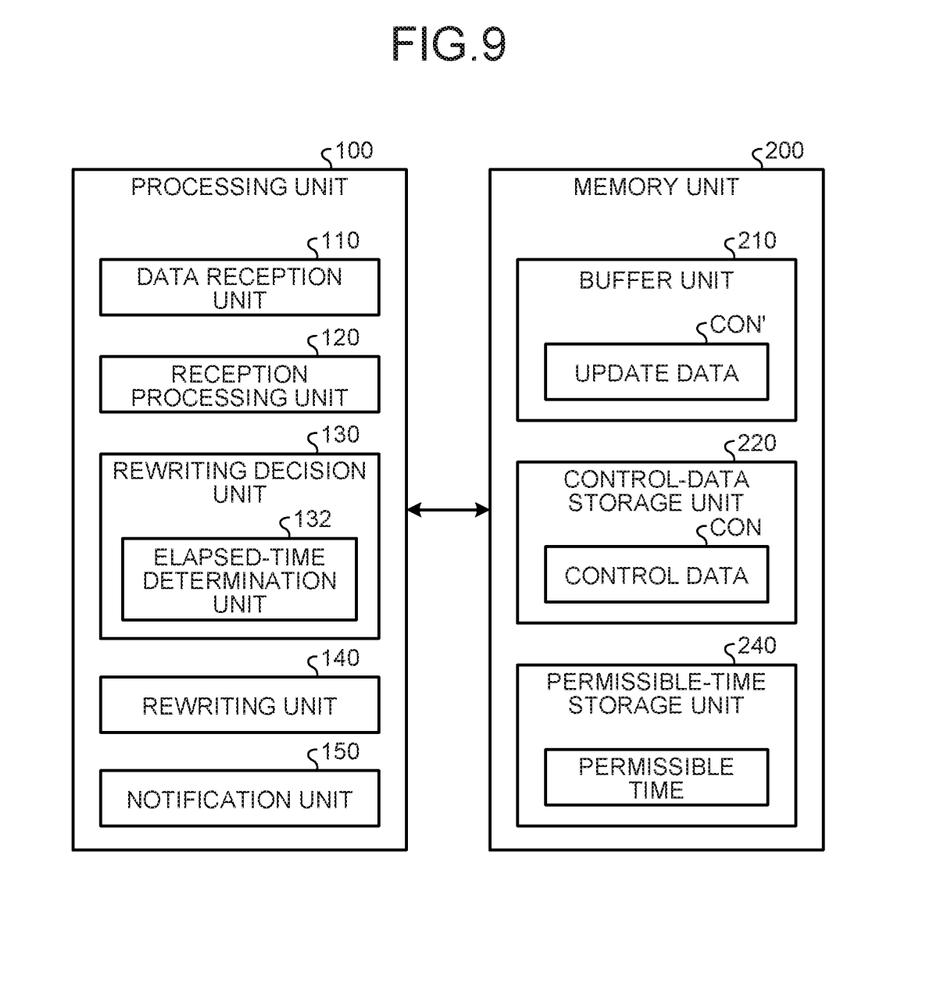
FIG. 9 is a block diagram illustrating a functional configuration of an air conditioner according to a third embodiment of the present invention.

FIG. 9 is a block diagram illustrating a functional configuration of the air conditioner 1 according to the present embodiment. Overlapping descriptions with the foregoing first and second embodiments will be omitted as appropriate. As shown in FIG. 9, as compared to the first embodiment described above, the processing unit 100 further includes the rewriting decision unit 130, and the memory unit 200 further includes a permissible-time storage unit 240.

Information indicating a permissible time is stored in the permissible-time storage unit 240. The permissible-time storage unit 240 is realized by the mask ROM 73 or the nonvolatile memory 71.

According to the present embodiment, the rewriting decision unit 130 includes an elapsed-time determination unit 132. The elapsed-time determination unit 132 determines whether or not an elapsed time since power-ON of the air conditioner 1 exceeds the permissible time indicated by the information stored in the permissible-time storage unit 240. If the elapsed time is equal to or less than the permissible time, the rewriting decision unit 130 permits the rewriting process (FIG. 8, Step S7; Yes). On the other hand, if the elapsed exceeds the permissible time, the rewriting decision unit 130 prohibits the rewriting process (FIG. 8, Step S7; No).

The present embodiment is useful, for example, for a case where both air conditioners 1 under operation checking or testing and other air conditioners 1 are present in the same area. An actuator operation checking may be performed in a commercial line, and a long-time testing may be performed in a development testing room. Regarding such the air conditioner 1 under the operation checking or the testing, it is not preferable to rewrite the control data CON. According to the present embodiment, it is possible by appropriately setting the permissible time to prevent the rewriting of the control data CON of the air conditioner 1 under operation checking or testing.

Fourth Embodiment

Figure 10:
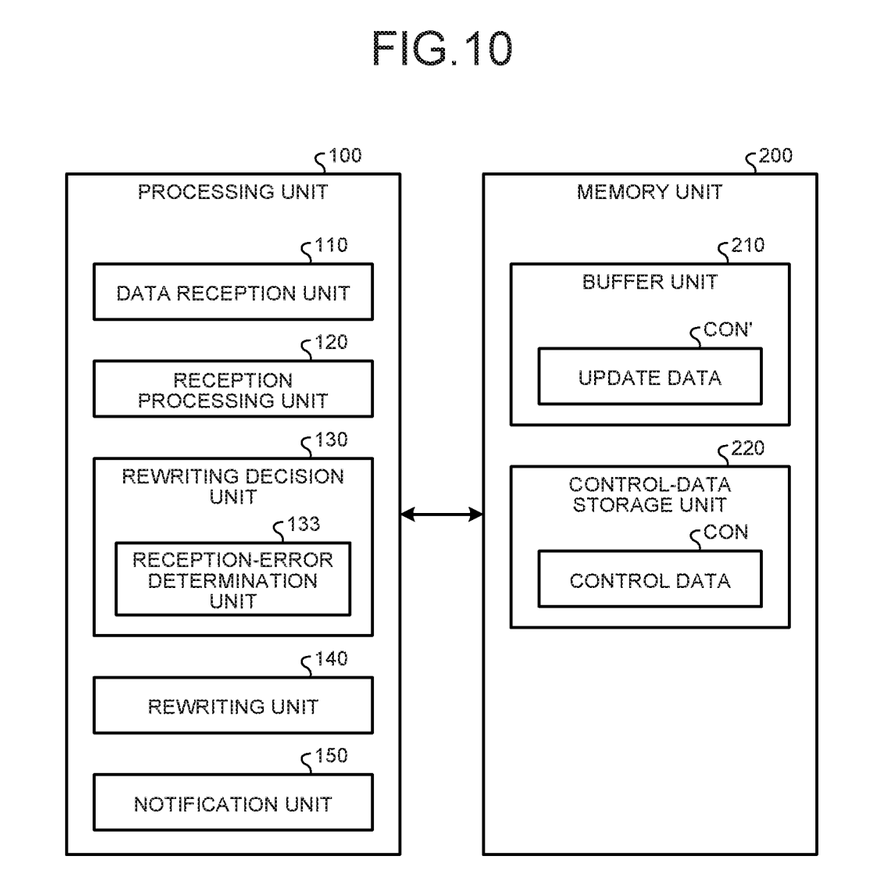
FIG. 10 is a block diagram illustrating a functional configuration of an air conditioner according to a fourth embodiment of the present invention.

FIG. 10 is a block diagram illustrating a functional configuration of the air conditioner 1 according to a fourth embodiment of the present invention. Overlapping descriptions with the foregoing first and second embodiments will be omitted as appropriate.

According to the present embodiment, the rewriting decision unit 130 includes a reception-error determination unit 133. The reception-error determination unit 133 determines whether or not there is a reception error in the received update data CON'. For example, the reception-error determination unit 133 can determine whether or not there is a reception error by performing checksum calculation with respect to the received update data CON'. If there is no reception error, the rewriting decision unit 130 permits the rewriting process (FIG. 8, Step S7; Yes). On the other hand, if there is a reception error, the rewriting decision unit 130 prohibits the rewriting process (FIG. 8, Step S7; No).

According to the present embodiment, rewriting errors of the control data CON can be further suppressed.

Fifth Embodiment

Figure 11:
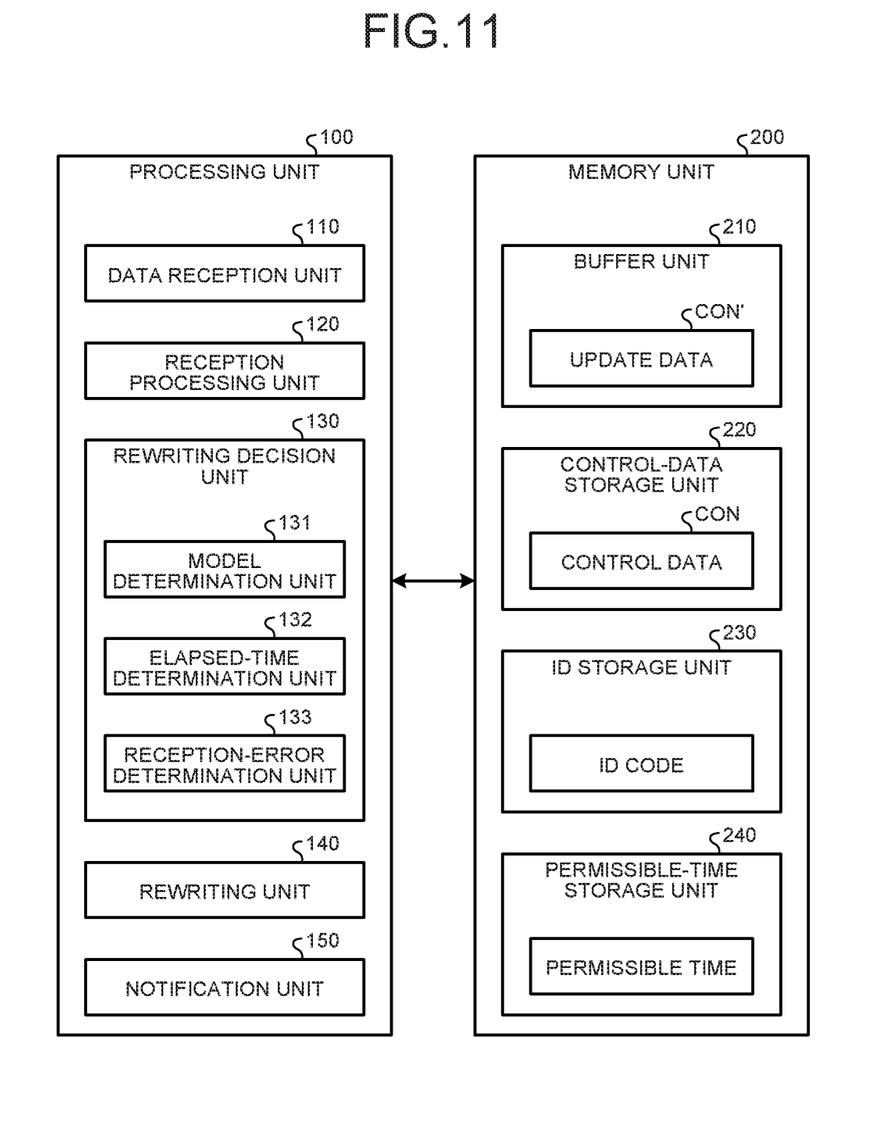
FIG. 11 is a block diagram illustrating a functional configuration of an air conditioner according to a fifth embodiment of the present invention.

It is also possible to combine some of the foregoing second to fourth embodiments as appropriate. For example, FIG. 11 illustrates a case where all the second to fourth embodiments are combined.

Sixth Embodiment

In the embodiments described above, the data reception unit 110 can be configured to be capable of receiving only wireless signals of a specific frequency. The specific frequency is set to different values depending on models of the air conditioner 1. The transmitter 2 transmits the update data CON' by using wireless signals of a specific frequency allocated to a desired model. As a result, in a case where there are plural models within the same area, it is possible to perform rewriting of the control data CON selectively only on the desired model.

Embodiments of the present invention have been described above with reference to the accompanying drawings. It should be noted that the present invention is not limited to the embodiments described above, and can be modified as appropriate by persons skilled in the art without departing from the scope thereof.

REFERENCE SIGNS LIST

1 air conditioner, 2 transmitter, 10 reception device, 20 display device, 30 alarm device, 40 controller, 50 I/O interface, 60 CPU, 70 memory device, nonvolatile memory, 72 RAM, 73 mask ROM, 100 processing unit, 110 data reception unit, 120 reception processing unit, 130 rewriting decision unit, 131 model determination unit, 132 elapsed-time determination unit, 133 reception-error determination unit, 140 rewriting unit, 150 notification unit, 200 memory unit, 210 buffer unit, 220 control-data storage unit, 230 ID storage unit, 240 permissible-time storage unit, CON control data, CON' update data.

The invention claimed is:

1. An air conditioner comprising:
a control data storage unit, which is a nonvolatile memory, to store therein control data for controlling the air conditioner;
a buffer unit to store therein updated control data; and
a processor configured to
control the air conditioner using the control data stored in the control data storage unit,
rewrite the control data stored in the control data storage unit with the updated control data stored in the buffer unit,
receive, repeatedly, through a wireless communication, the updated control data, wherein a same updated control data is transmitted a plurality of times from a transmitter; and
a reception processing unit to
determine whether or not the rewrite is in progress at a time when the updated control data is received,
discard the received updated control data if the rewrite is in progress, and
store the received updated control data in the buffer unit if the rewrite is not in progress,
wherein the processor is further configured to
decide whether to permit or prohibit rewriting the control data, and
rewrite the control data when permitted by the processor, and
determine whether or not an elapsed time since power-ON of the air conditioner exceeds a predetermined time, and
prohibit the rewrite when the elapsed time exceeds the predetermined time.

2. The air conditioner according to claim 1, wherein the processor is further configured to
determine whether or not the received updated control data is for a model of the air conditioner, and
permit the rewrite when the received updated control data is for the model of the air conditioner.

3. The air conditioner according to claim 2, further comprising
an ID storage unit to store therein identification information of a target air conditioner model, wherein the updated control data includes identification information of the model of the air conditioner, and
wherein the processor is further configured to
determine whether or not the received updated control data is for the model of the air conditioner based on whether or not the identification information included in the received updated control data matches the identification information of the target air conditioner stored in the ID storage unit.

4. The air conditioner according to claim 1, wherein the processor is further configured to
determine whether or not a reception error exists in the received updated control data, and
permit the rewrite when the reception error does not exist in the received updated control data.

5. The air conditioner according to claim 1, wherein the processor is further configured to notify a user of completion of the rewrite.

6. An air conditioner system comprising:
an air conditioner to perform air-conditioning control based on control data; and
a transmitter to transmit updated control data multiple times through a wireless communication,
wherein the air conditioner comprises:
a control data storage unit, which is a nonvolatile memory, to store therein the control data;
a buffer unit to store therein the updated control data; and
a processor configured to
control the air conditioner using the control data stored in the control data storage unit,
rewrite the control data stored in the control data storage unit with the updated control data stored in the buffer unit,
receive, repeatedly, through a wireless communication, the transmitted updated control data, wherein a same updated control data is transmitted a plurality of times from the transmitter; and
a reception processing unit to
determine whether or not the rewrite is in progress at a time when the updated control data is received,
discard the received updated control data if the rewrite is in progress, and
store the received updated control data in the buffer unit if the rewrite is not in progress,
wherein the processor is further configured to
decide whether to permit or prohibit rewriting the control data, and
rewrite the control data when permitted by the processor, and
determine whether or not an elapsed time since power-ON of the air conditioner exceeds a predetermined time, and
prohibit the rewrite when the elapsed time exceeds the predetermined time.

7. The air conditioner system according to claim 6, wherein the processor is further configured to
determine whether or not the received updated control data is for a model of the air conditioner, and
permit the rewrite when the received updated control data is for the model of the air conditioner.

8. The air conditioner system according to claim 7, further comprising an an ID storage unit to store therein identification information of a target air conditioner model, wherein the updated control data includes identification information of the model of the air conditioner, and wherein the processor is further configured to determine whether or not the received updated control data is for the model of the air conditioner based on whether or not the identification information included in the received updated control data matches the identification information of the target air conditioner stored in the ID storage unit.

9. The air conditioner system according to claim 6, wherein the processor is further configured to determine whether or not a reception error exists in the received updated control data, and permit the rewrite when the reception error does not exist in the received updated control data.

10. The air conditioner system according to claim 6, wherein the processor is further configured to notify a user of completion of the rewrite.

11. A non-transitory recording medium on which a rewrite control program that is executed by a controller of an air conditioner is recorded, wherein the controller comprises:

a control data storage unit, which is a nonvolatile memory, to store therein control data for controlling the air conditioner;

a buffer unit to store therein updated control data;

a processor that controls the air conditioner using the control data stored in the control data storage unit and;

a data reception unit that receives, repeatedly, through a wireless communication, the updated control data, wherein a same updated control data is transmitted a plurality of times from a transmitter, wherein the rewrite control program causes the controller to execute steps of:

rewriting the control data stored in the control data storage unit with the update data stored in the buffer unit;

determining whether or not the rewrite is in progress at a time when the updated control data is received;

discarding the received updated control data if the rewrite is in progress; and storing the received updated control data in the buffer unit if the rewrite is not in progress, wherein the controller is caused to execute steps of deciding whether to permit or prohibit the rewriting process, and executing the rewriting when permitted, and determining whether or not an elapsed time since power-ON of the air conditioner exceeds a predetermined time, and prohibiting the rewriting when the elapsed time exceeds the predetermined time.

12. The non-transitory recording medium according to claim 11, wherein the processor further determines whether or not the received updated control data is for a model of the air conditioner, and permits the rewrite when the received updated control data is for the model of the air conditioner.

13. The non-transitory recording medium according to claim 12, the controller further comprising an ID storage unit to store therein identification information of a target air conditioner model, wherein the updated control data includes identification information of the model of the air conditioner, and wherein the processor further determines whether or not the received updated control data is for the model of the air conditioner based on whether or not the identification information included in the received updated control data matches the identification information of the target air conditioner stored in the ID storage unit.

14. The non-transitory recording medium according to claim 11, wherein the processor further determines whether or not a reception error exists in the received updated control data, and permits the rewrite when the reception error does not exist in the received updated control data.

* * * * *